May 17, 1949.　　　　S. KRILANOVICH　　　　2,470,496
WHEEL STEERING MECHANISM
Filed Sept. 22, 1947　　　　　　　　　　3 Sheets-Sheet 1
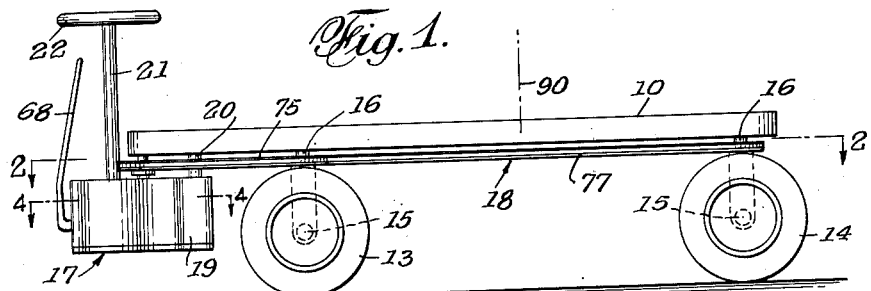
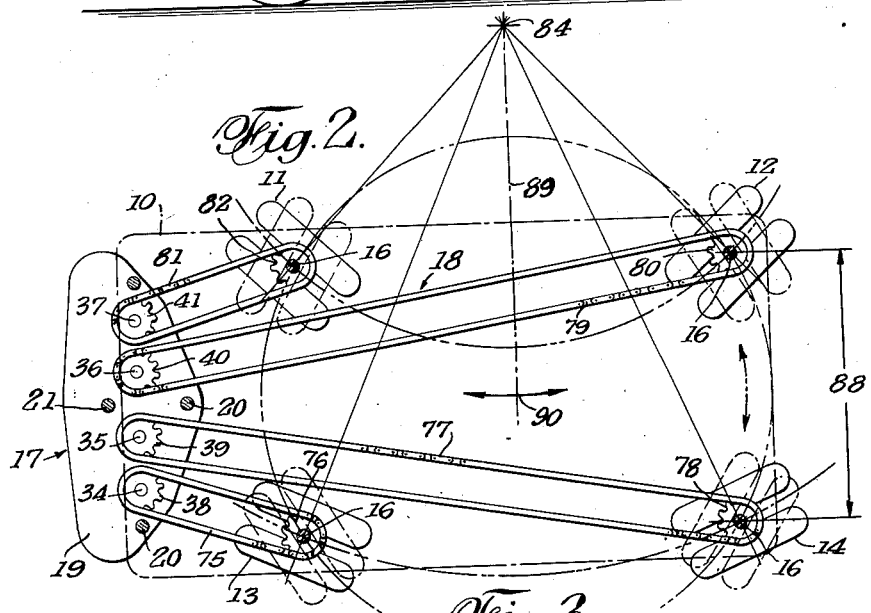
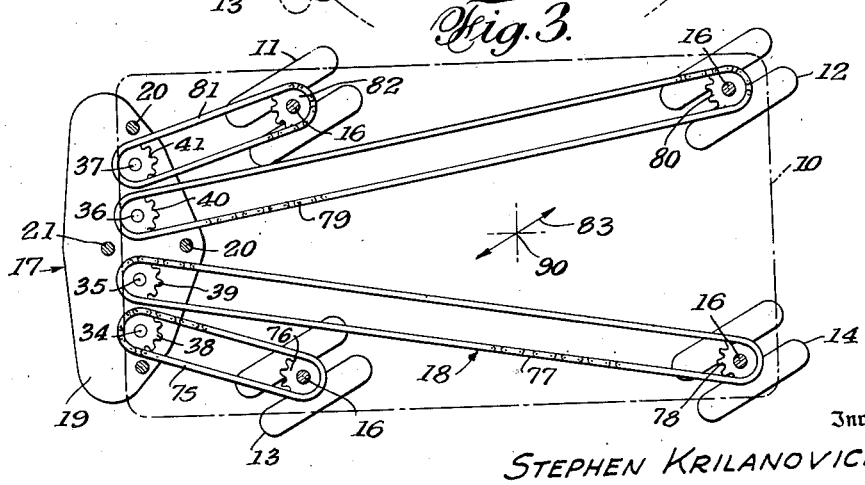
Inventor
STEPHEN KRILANOVICH
By C. G. Stratton
Attorney May 17, 1949.  S. KRILANOVICH  2,470,496
WHEEL STEERING MECHANISM
Filed Sept. 22, 1947  3 Sheets-Sheet 2

Inventor
STEPHEN KRILANOVICH
By C. G. Stratton
Attorney

May 17, 1949. S. KRILANOVICH 2,470,496
WHEEL STEERING MECHANISM
Filed Sept. 22, 1947 3 Sheets-Sheet 3

Inventor
STEPHEN KRILANOVICH
By C. G. Stratton
Attorney

Patented May 17, 1949

2,470,496

UNITED STATES PATENT OFFICE 2,470,496

WHEEL STEERING MECHANISM

Stephen Krilanovich, North Hollywood, Calif.

Application September 22, 1947, Serial No. 775,424

7 Claims. (Cl. 280—91)

This invention relates to means for steering the wheels of a dolly or truck and deals more particularly with such means incorporated in a dolly on which is mounted a motion picture camera.

In shooting motion pictures, many desired technical effects are obtained by mounting the camera for movement relative to the subject or scene being photographed. The flexibility of movement of the camera, of course, allows for a great variety of such effects, but such movement must be accomplished without jar or abrupt changes of direction.

An object of the present invention, therefore, is to provide a dolly, for the more particular purpose of mounting a motion picture camera, which is supported on wheels and embodying means whereby said wheels may, selectively, be steered to provide universal and smooth movement of the dolly and the camera thereon.

Another object of the invention is to provide a dolly, as indicated, in which the wheels thereof can be directed for movement of the dolly in any direction in a straight line—forward, backward, transverse or oblique.

Another object of the invention is to provide a dolly in which the wheels thereof can be steered for movement of the dolly in an arcuate path around a point outside of the wheels.

A further object of the invention is to provide a dolly in which the wheels thereof can be steered for circular movement of the dolly about a point central of the wheels.

A still further object of the invention is to provide the wheels of a dolly with novel transmission means whereby said wheels may, selectively, be steered to like angular positions, to tangential positions with respect to arcs generated about a point outside the wheels, and to positions tangent to a circle generated about a point central of the wheels whereby universal movement of the dolly is obtained.

A still further object of the invention is to provide a novel and improved transmission whereby the wheels on one side of a dolly are positioned tangent to an arc generated about a point outside said wheels and the wheels on the other side of the dolly are positioned tangent to a greater or smaller arc also generated about said point, whereby the dolly is adapted to track on its wheels smoothly and without jar.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a side elevational view of a dolly according to the present invention.

Fig. 2 is a plan sectional view thereof on line 2—2 of Fig. 1 with the dolly wheels, in full lines, set to track in an arcuate path about a point outside the wheels and, in dot-dash lines, to track about a point within the wheels.

Fig. 3 is a similar view with the dolly wheels set to track along a line oblique to the longitudinal dimension of the dolly.

Figure 4:
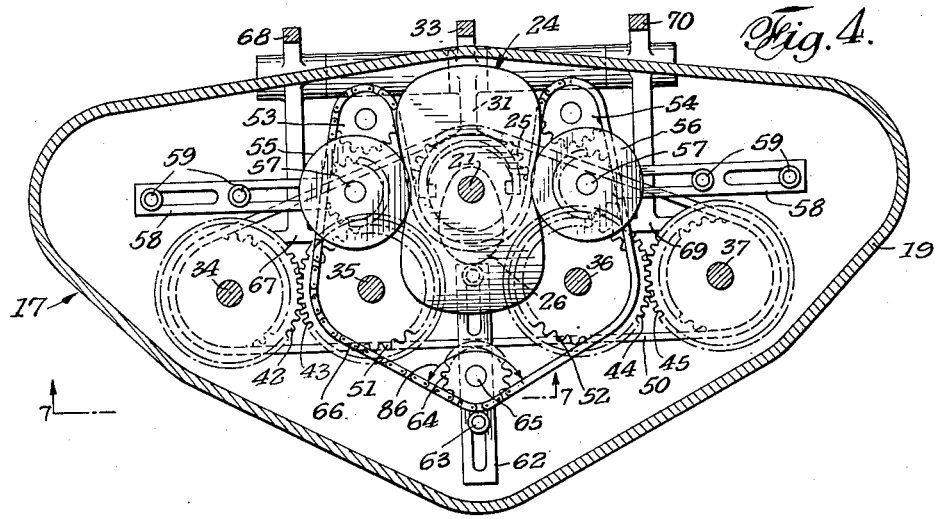
Fig. 4 is an enlarged plan sectional view through the transmission on line 4—4 of Fig. 1 showing said transmission in the positions its parts assume with the wheels aligned as in Fig. 1.

The dolly which is illustrated comprises, generally, a platform 10, wheels 11 and 12 at the respective front and rear of one side of said platform, wheels 13 and 14 at the respective front and rear of the other side of the platform, an axle 15 for each of said wheels, a vertically disposed horizontally pivotal bracket 16 mounting each axle and connected to the platform, a transmission unit 17, and chain and sprocket means 18 operatively connecting said transmission unit and the brackets 16.

In the present instance, each wheel 11, 12, 13 and 14 is shown as a double wheel mounted on the respective axles 15 and it will be understood that these may be single wheels, if desired. Also, the wheels are shown as free-running and the dolly, therefore, moved by pushing the same, but it is evident that one or more of said wheels may be driven by suitable motive power.

The transmission 17 is enclosed in a casing 19 and the latter is secured to platform 10 as by studs 20 and preferably at the front end of said platform.

The transmission, centrally thereof, is provided with a control shaft 21 that extends upwardly and, at its upper end is provided with a steering wheel 22 whereby said shaft is rotatable in either direction. Within the casing 19, shaft 21 is fitted with a loose sleeve 23 which carries a four-lobed cam 24 adjacent the top wall of the casing, a sprocket wheel 25 beneath said cam, and a single-lobed cam 26 beneath the sprocket wheel. The sleeve 23 is formed with down-reaching clutch teeth 27 for engagement with a clutch sleeve 28 that is slideable on shaft 21 and keyed thereto. On the opposite side of the clutch sleeve 28, a loose sprocket wheel 29 is provided on said shaft 21 adjacent the bottom wall of casing 19 and the latter is formed with upstanding clutch teeth 30 for engagement with the clutch sleeve. The latter is formed as a spool for engagement by a fork 31, pivoted on a shaft 32, and having an operating handle 33 extending upwardly from the transmission casing toward the steering wheel 22. It will be evident that by suitable manipulation of handle 33, the clutch sleeve 28 can be coupled to the sleeve 23 and the sprocket wheel 29, selectively, whereby one or the other is rotatable with shaft 21.

Across the transmission casing and extending from the bottom wall thereof through the top wall shafts 34, 35, 36 and 37 are provided. These shafts are, respectively, provided with sprocket wheels 38, 39, 40 and 41 on the portions thereof above the casing. Gears 42 and 43 connect shafts 34 and 35 for simultaneous but opposite rotation, and similar gears 44 and 45 connect shafts 36 and 37 for similar rotation. However, said four gears are loose on their respective shafts and each, like the sleeve 23, is provided with down-reaching clutch teeth 46 for engagement with clutch sleeve 47 slideably keyed on each of shafts 34, 35, 36 and 37. Thus, the mentioned simultaneous opposite rotation of the shafts is effected only when the clutch sleeves 47 are moved to engage teeth 46 of the gears. Each of the mentioned shafts, at its lower end is provided with a loose sprocket gear 48 having upstanding clutch teeth 49. Said wheels 48 and teeth 49 being similar to the sprocket wheel 29 and clutch teeth 30. A chain 50 is trained around the sprocket wheels 29 and 48, as best seen in Figs. 4, 5, 7 and 8, whereby all of said wheels rotate in the same direction and to the same degree.

The gear 43, in alignment with sprocket wheel 25, is provided with a similar wheel 51 fixed therewith. Similarly, the gear 44 is provided with a sprocket wheel 52. Idler sprocket wheels 53 and 54, one on each side of shaft 21, are provided in planar alignment with sprocket wheels 25, 51 and 52.

In planar alignment with cam 24, roller discs 55 and 56, one on each side of said cam, are provided. Each disc is freely mounted on a shaft 57 carried by a bar 58 mounted to slide laterally on fixed studs 59 carried by the casing 19. In the plane of sprocket wheels 25, 51, 52, 53 and 54 and freely rotatable on shafts 57 there are provided sprocket wheels 60 and 61, one on each of said shafts 57.

A bar 62 is arranged to engage cam 26 and to be moved thereby in a direction normal to the movement of bars 58 and on guide studs 63. Said bar 62 carries a freely rotatable sprocket wheel 64 on a shaft 65 coplanar with sprocket wheels 60 and 61.

A chain 66 is trained around sprocket wheel 25 and around and in driving engagement with sprocket wheels 53, 60, 51, 64, 52, 61 and 54 in such a manner that, upon clockwise rotation of sprocket wheel 25, the other wheels will be rotated counterclockwise and that upon counterclockwise rotation of sprocket wheel 25, the other wheels will be rotated clockwise.

A clutch-operating fork 67, engaged with the clutch sleeves 47 of shafts 34 and 35, is mounted to rock on shaft 32 through manipulation of a handle 68 for selective engagement of said clutch sleeves with clutch teeth 46 and 49. Similarly, a clutch-operating fork 69 having a handle 70 is engaged with clutch sleeves 47 of shafts 36 and 37.

The lobes of cam 24 have been designated 71, 72, 73 and 74 and in the normal position of Fig. 4, the roller disc 55 engages said cam between lobes 71 and 72, and roller disc 56, between lobes 73 and 74.

The means 18 comprises a chain 75, is trained over sprocket wheel 38 and over a similar wheel 76 fixed to the pivoted bracket 16 of wheel 13; a chain 77 is trained over sprocket wheel 39 and over a sprocket wheel 78 fixed on the bracket of wheel 14; a chain 79 is trained over sprocket wheel 40 and over a sprocket wheel 80 fixed on the bracket of wheel 12; and a chain 81 is trained over sprocket wheel 41 and over a sprocket wheel 82 fixed on the bracket of wheel 11.

Fig. 4 shows the parts of the transmission arranged to have the means 18 position the wheels of the dolly as in Fig. 1, whereby said dolly is movable to and fro along its longitudinal dimension.

When it is desired to steer the wheels to any oblique position as in Fig. 3, whereby the dolly is movable along an oblique line 83; or to arrange the wheels so they stand at right angles to their initial position, whereby the dolly is movable in a path transverse to the longitudinal dimension of the platform, the clutch handle 33 is moved to shift clutch sleeve 28 into engagement with clutch teeth 30 of sprocket wheel 29. Similarly, both clutch handles 68 and 70 are manipulated to effect coupling of each sprocket wheel 48 with its respective shaft 34, 35, 36 and 37. Now, upon turning the steering wheel 22, in either direction, shaft 21 will turn sprocket 29 and, through chain 50, sprockets 48, in the same direction. These latter sprockets being coupled to their respective shafts 34, 35, 36 and 37, said shafts will turn to turn the respective sprockets 38, 39, 40 and 41, the respective chains 75, 77, 79 and 81 and, through sprockets 76, 78, 80 and 82, the respective wheels 13, 14, 12 and 11 in the same direction. Each wheel will turn a similar amount and the degree of turn is controlled by the amount of the turn imparted to the steering wheel. During this steering movement, cams 24 and 26, and sprocket 25 and those connected to it by chain 66, are uncoupled from their respective shafts and, therefore, stationary.

When it is desired to steer the wheels of the dolly so that the same is movable in an arc about a center outside of the wheels, such as the center 84, the three clutch handles 33, 68 and 70 are manipulated to effect coupling of clutch sleeve 28 with sleeve 23 and of the clutch sleeves 47 with the respective gears 42, 43, 44 and 45, whereby the latter and sprockets 51 and 52 are connected to drive the shafts 34, 35, 36 and 37, respectively.

Figure 5:
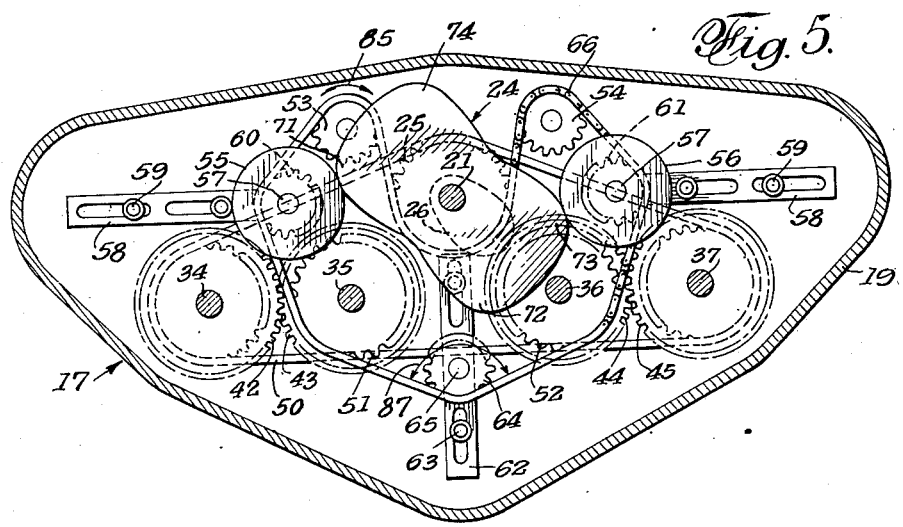
Fig. 5 is a similar view showing the transmission parts in the position they assume with the wheels as in the full line position of Fig. 2.

Assuming that the steering wheel is turned counter-clockwise as seen from the top, sprocket 25 will turn counter-clockwise to cause a pull on chain 66 in the direction of arrow 85. This pull on the chain would normally cause a corresponding rotational movement of sprockets 51 and 52. However, the cam lobes 71 and 73 of cam 24, simultaneously, move roller discs 55 and 56 outwardly and, consequently, sprockets 60 and 61 move outwardly to bulge chain 66 as shown in Fig. 5. Thus, as the chain is moved by sprocket 25, that portion thereof trained between sprockets 60 and 51 moves faster to impart a greater angular rotational movement to sprocket 51 than was imparted to sprocket 25 by the steering wheel.

As the above chain movement occurs, the bight of the chain that is trained over sprocket 64, is reduced in length between sprockets 51 and 52 under control of cam 26 which moves bodily with cam 24. This shortening of the chain bight results in a lesser angular rotational movement of sprocket 52, the sprocket 61 merely maintaining the chain taut. It will be evident that the chain bight between sprockets 53 and 51 is lengthened to cause increased rotational movement of sprocket 51 and that the chain bight between sprockets 51 and 52 is shortened to cause a relatively lesser rotational movement of sprocket 52.

Both sprockets 51 and 52 rotate in the same direction and, because of their connection to the respective shafts 35 and 36 and the respective chain connections 77 and 79 to wheels 14 and 12, said wheels are respectively rotated on brackets 16 an angular amount comparable to that of the respective sprockets. The pairs of gears 42 and 43, and 44 and 45 cause similar but opposite rotation of shafts 34 and 37 and of wheels 13 and 11, respectively.

Fig. 2 shows the full line position of the wheels as they are steered by a clockwise rotation of the steering wheel and of cam 24, in which case, the chain bight between sprockets 54 and 52 moves the latter sprocket through a greater angular movement with a resultant lesser angular movement of sprocket 51.

It will be evident that the lobes 71, 72, 73 and 74 of cam 24 are designed to merely press sprockets 60 and 61 outwardly and that the ratio of the angular movement of sprockets 51 and 52 is a function of the degree with which the chain bight trained over sprocket 64 lessens. This ratio can then be resolved as an inverse ratio of angle 86 of Fig. 4 and angle 87 of Fig. 5.

Figure 6:
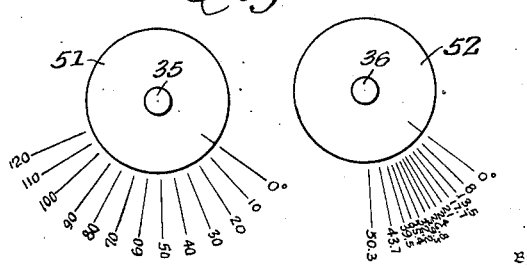
Fig. 6 is a schematic view showing the different angular relative movements of parts resulting in the full line position of the wheels in Fig. 2.
Figure 7:
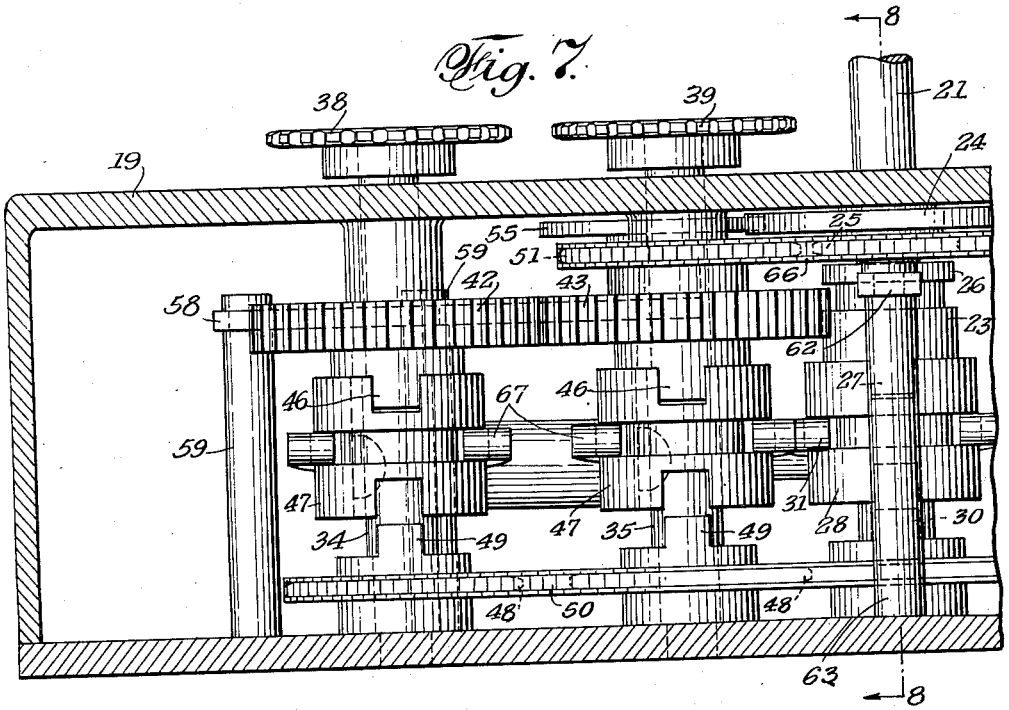
Fig. 7 is a further enlarged cross-sectional view as taken on line 7—7 of Fig. 4.
Figure 8:
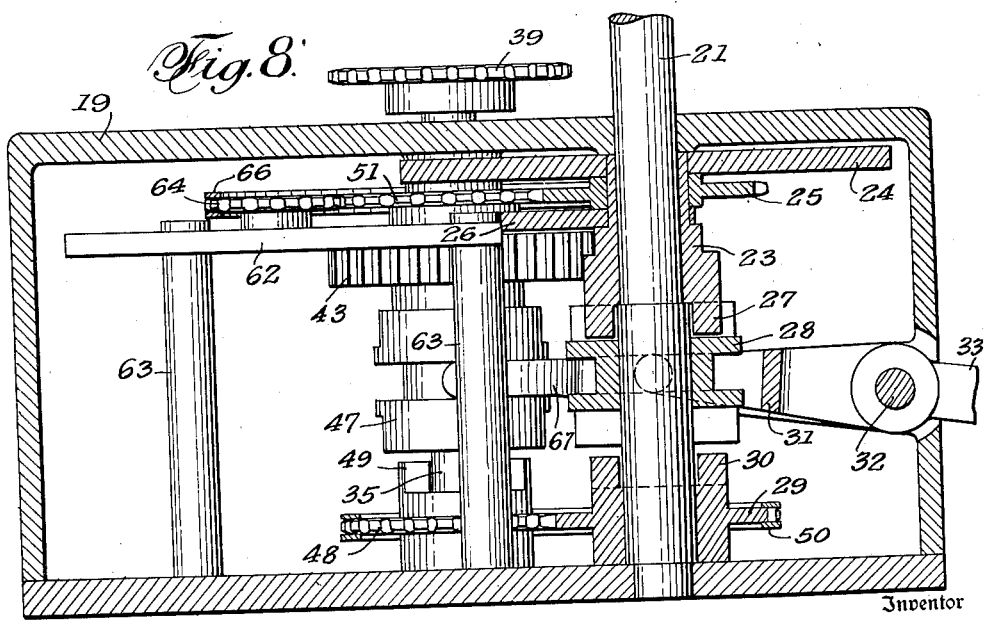
Fig. 8 is a cross-sectional view as taken on line 8—8 of Fig. 7.

By consulting Fig. 6, it will be seen that for each uniform 10° increment of angular movement of one sprocket the other has not only a lesser increment of angular movement but said latter increments are first greater, then decreasingly smaller, and then increasingly larger.

Inasmuch as the angular positions of the wheels of the dolly are desired to be such that they will smoothly track about a point 84, said angular positions are directly related to the transverse spacing of the front and rear wheels. Closer spacing of said wheels entails a lesser difference in the angular increments of movement of the wheels and, conversely, a greater spacing, a greater difference in said angular increments.

Assuming the wheel-spacing dimension 88 to be 28½ inches, the following table, based on Fig. 6, shows in the first column, the uniform increment of angular movement of sprocket 51, in the second column, the variable increment of angular movement of sprocket 52, and in the third column, the corresponding successive differences in movement of the latter sprocket.

| Sprocket 51 | Sprocket 52 | Difference |
| --- | --- | --- |
| Degrees | Degrees | Degrees |
| 0 | 0 | 0 |
| 10 | 8.0 | 8.0 |
| 20 | 13.5 | 5.5 |
| 30 | 17.7 | 4.2 |
| 40 | 21.0 | 3.3 |
| 50 | 24.0 | 3.0 |
| 60 | 26.8 | 2.8 |
| 70 | 29.5 | 2.7 |
| 80 | 32.2 | 2.7 |
| 90 | 35.4 | 3.2 |
| 100 | 39.5 | 4.1 |
| 110 | 43.7 | 4.2 |
| 120 | 50.3 | 6.6 |
| 125.2 | 54.8 | ------------- |

The figures of the last two columns are, necessarily somewhat approximate and are primarily intended to show the variability of the movement of one sprocket during the uniform movement of the other. The point 84 can reside anywhere along line 89 and may approach the center 90 of the dolly and yet the wheels can be positioned so that said dolly arcuately tracks about said point.

It will be noted that the last figure for sprocket 51 is 125.2° and for sprocket 52, 54.8°. By turning the steering wheel 22 in either direction, assuming a counter-clockwise rotation of said steering wheel and continuing the rotation until sprocket 52 has rotated 50.2°, the wheels 11 and 12, as shown by the dot-dash lines, will be rotated to angular positions of like degree, but each in the opposite direction. For the spacing of the wheel centers indicated these wheels will now be tangent to a circle generated about the center 90 of the dolly. During this angular movement of sprocket 52, sprocket 51 will rotate through an arc of 125.2° to bring wheels 13 and 14 also tangent to said circle. The dolly can then be readily rotated about the center point 90.

By suitably mounting a camera at the center 90, it will be seen that said camera can be moved in any straight line toward, away from, transversely and obliquely with respect to a subject being "shot"; that said camera can be moved to circle a subject; and that said camera can be moved to snap a scene or other panoramic area. It will be further seen that the mentioned universal movement of the camera and of the dolly is effected smoothly and with a jar.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In combination, a platform, four horizontally pivotal wheels supporting said platform and arranged in pairs along each side of said platform, a transmission, steering means for manually controlling said transmission, means connecting said steering means with said wheels for steering one pair thereof to a position tangent to an arc generated about a point located along a line midway between said latter pair of wheels and for simultaneously steering the other pair of wheels to a position tangent to an arc generated about said point and passing through the pivots of the latter pair of wheels, clutch-controlled means for selectively connecting the steering means and the means connecting the same to the wheels to steer all of said wheels simultaneously in the same direction, and additional clutch means for selectively connecting the steering means and the means connecting the same to one pair of wheels to steer the latter to a position tangent to a circle generated about a point central of all the wheels and for subsequently connecting the steering means and the means connecting the same to the other pair of wheels to steer the latter to a position also tangent to said circle.

2. A transmission comprising at least two shafts; a sprocket wheel on each shaft, a steering post; a sprocket wheel thereon, a cam on the steering post; a pair of sprocket wheels mounted for opposed movement under control of said cam; a second cam on said steering post, and a sprocket wheel mounted for movement transverse to the movement of the sprocket wheels controlled by the first cam; said sprocket wheels all being coplanar; and a chain trained about the sprocket wheels whereby they all rotate in unison upon manual rotation of the steering post; and whereby the mentioned opposed movement of said pair of sprocket wheels effects a greater distance of travel of that portion of the chain engaged with the sprocket wheel of one of said shafts, with a corresponding greater angular travel of the latter sprocket wheel and its shaft, than is imparted to the chain by the mentioned manual rotation of the steering post and its sprocket wheel.

3. A transmission comprising at least two shafts; a sprocket wheel on each shaft; a steering post; a sprocket wheel thereon; a cam on the steering post; a pair of sprocket wheels mounted for opposed movement under control of said cam; a second cam on said steering post; and a sprocket wheel mounted for movement transverse to the movement of the sprocket wheels controlled by the first cam; said sprocket wheels all being coplanar; and a chain trained about the sprocket wheels whereby they all rotate in unison upon manual rotation of the steering post; and whereby the mentioned opposed movement of said pair of sprocket wheels effects a greater distance of travel of that portion of the chain engaged with the sprocket wheel of one of said shafts, with a corresponding greater angular travel of the latter sprocket wheel and its shaft, than is imparted to the chain by the mentioned manual rotation of the steering post and its sprocket wheel; and whereby the transversely movable sprocket wheel, under control of the second cam, moves to effect a shortening of that portion of the chain extending between the sprocket wheel having the greater angular travel and the sprocket wheel on the other shaft to reduce the travel of that portion of the chain engaged with the latter sprocket wheel, with a corresponding lesser angular travel in the same direction of said latter sprocket wheel and its shaft.

4. A transmission comprising at least two shafts; a sprocket wheel on each shaft; a steering post; a sprocket wheel thereon; a cam on the steering post; a pair of sprocket wheels mounted for opposed movement under control of said cam; a second cam on said steering post; and a sprocket wheel mounted for movement transverse to the movement of the sprocket wheels controlled by the first cam; said sprocket wheels all being coplanar; a chain trained about the sprocket wheels whereby they all rotate in unison upon manual rotation of the steering post; and whereby the mentioned opposed movement of said pair of sprocket wheels effects a greater distance of travel of that portion of the chain engaged with the sprocket wheel of one of said shafts, with a corresponding greater angular travel of the latter sprocket wheel and its shaft, than is imparted to the chain by the mentioned manual rotation of the steering post and its sprocket wheel; and whereby the transversely movable sprocket wheel, under control of the second cam, moves to effect a shortening of that portion of the chain extending between the sprocket wheel having the greater angular travel and the sprocket wheel on the other shaft to reduce the travel of that portion of the chain engaged with the latter sprocket wheel, with a corresponding lesser angular travel in the same direction of said latter sprocket wheel and its shaft; a second pair of shafts; and gearing connecting the latter and the first-mentioned shafts for rotating the second pair of shafts in a direction opposite to that of the first-mentioned shafts.

5. A transmission for steering the four wheels of a vehicle comprising at least two shafts; a sprocket wheel on each shaft; a steering post, a sprocket wheel thereon; a cam on the steering post; a pair of sprocket wheels mounted for opposed movement under control of said cam; a second cam on said steering post; and a sprocket wheel mounted for movement transverse to the movement of the sprocket wheels controlled by the first cam; said sprocket wheels all being coplanar; a chain trained about the sprocket wheels whereby they all rotate in unison upon manual rotation of the steering post; and whereby the mentioned opposed movement of said pair of sprocket wheels effects a greater distance of travel of that portion of the chain engaged with the sprocket wheel of one of said shafts, with a corresponding greater angular travel of the latter sprocket wheel and its shaft, than is imparted to the chain by the mentioned manual rotation of the steering post and its sprocket wheel; and whereby the transversely movable sprocket wheel, under control of the second cam, moves to effect a shortening of that portion of the chain extending between the sprocket wheel having the greater angular travel and the sprocket wheel on the other shaft to reduce the travel of that portion of the chain engaged with the latter sprocket wheel, with a corresponding lesser angular travel in the same direction of said latter sprocket wheel and its shaft; a second pair of shafts; gearing connecting the latter and the first-mentioned shafts for rotating the second pair of shafts in a direction opposite to that of the first-mentioned shafts; a vertically disposed horizontal pivot for each wheel; and chain and sprocket means operatively connecting the four mentioned shafts and each respective wheel pivot.

6. In a wheel steering device, a pair of sprocket wheels; a steering post; a sprocket wheel on said post; a chain trained about said sprocket wheels; and means effective, upon manual rotation of the steering post, for lengthening those portions of the chain extending between the sprocket wheel on the steering post and each of the other sprocket wheels, and, correspondingly, shortening that portion of the chain extending between the pair of sprockets, whereby one of the latter sprockets has a greater and the other has a lesser angular movement than is manually imparted to the sprocket on the steering post; the latter means comprising a cam on the steering post; a sprocket wheel, one on each side of the cam and each engaged with the first-mentioned portions of the chain; means engaged with the cam for moving the latter sprocket wheels in a direction to effect lengthening the mentioned chain portions; and means responsive to the pull thus exerted on the chain to effect foreshortening of that portion thereof between the pair of sprockets.

7. In a wheel steering device, a pair of sprocket wheels; a steering post; a sprocket wheel on said post; a chain trained about said sprocket wheels; and means effective, upon manual rotation of the steering post, for lengthening those portions of the chain extending between the sprocket wheel on the steering post and each of the other sprocket wheels, and, correspondingly, shortening that portion of the chain extending between the pair of sprockets, whereby one of the latter sprockets has a greater and the other has a lesser angular movement than is manually imparted to the sprocket on the steering post; said latter means comprising a cam on the steering post; a sprocket wheel, one on each side of the cam and each engaged with the first-mentioned portions of the chain; means engaged with the cam for moving the latter sprocket wheels in a direction to effect lengthening the mentioned chain portions; and means responsive to the pull thus exerted on the chain to effect foreshortening of that portion thereof between the pair of sprockets; said latter means comprising a second cam on the steering post, a sprocket wheel movable thereby and engaged with the latter portion of the chain.

STEPHEN KRILANOVICH.

REFERENCES CITED

The following references are of record in the file of this patent:

UNITED STATES PATENTS

| Number | Name | Date |
| --- | --- | --- |
| 1,255,775 | Mueller | Feb. 5, 1918 |
| 1,866,393 | Brooks | July 5, 1932 |
| 2,001,647 | Alt | May 14, 1935 |
| 2,232,015 | Skok | Feb. 18, 1941 |
| 2,423,266 | Stokes | July 1, 1947 |

FOREIGN PATENTS

| Number | Country | Date |
| --- | --- | --- |
| 451,813 | Great Britain | Aug. 12, 1936 |